United States Patent
Peters

(10) Patent No.: US 6,441,825 B1
(45) Date of Patent: Aug. 27, 2002

(54) VIDEO TOKEN TRACKING SYSTEM FOR ANIMATION

(75) Inventor: Geoffrey W. Peters, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/411,201

(22) Filed: Oct. 4, 1999

(51) Int. Cl.$^7$ ................................................ G06T 15/00
(52) U.S. Cl. ...................................................... 345/473
(58) Field of Search .................................... 345/418, 473, 345/474, 475

(56) References Cited

U.S. PATENT DOCUMENTS

| | | | | |
|---|---|---|---|---|
| 4,490,741 A | * | 12/1984 | Hornback | 358/152 |
| 5,761,678 A | | 6/1998 | Bendert et al. | 707/204 |
| 5,801,785 A | * | 9/1998 | Crump et al. | 348/563 |
| 6,020,931 A | * | 2/2000 | Bilbrey et al. | 348/584 |
| 6,157,396 A | | 12/2000 | Margulis et al. | 345/506 |

OTHER PUBLICATIONS

"Representation and Recognition of Action Using Temporal Templates," IEEE Conference on Computer Vision and Pattern Recognition (CVPR'97), J. Davis and A. Bobick.

"Virtual PAT: A Virtual Personal Aerobics Trainer," MIT Media Lab, J. Davis and A. Bobick.

"Real–Time Hand Tracking and Gesture Recognition Using Smart Snakes"–Tony Heap and Ferdinando Samaria of Olivetti Research Limited.

"A Generic System for Image interpretation using Flexible templates", A.F. Hill, T.F. Cootes, and C.J. Taylor, Proc. British Machine Vision Conference.

"Local Correlation measures for motion analysis: a comparative study." P.J. Burt, C. Yen, and X. Xu, IEEE CPRIP.

* cited by examiner

*Primary Examiner*—Cliff N. Vo
(74) *Attorney, Agent, or Firm*—Kenyon & Kenyon

(57) ABSTRACT

An animation system includes a video source filter, a tracker, a command recognizer, a character synthesizer, a character store, an overlay module, a video rendering filter and, optionally, a video store. The video source filter routes input video data to a tracker and a command recognizer. The command recognizer identifies predetermined patterns in the video input information and identifies the type of patterns. The tracker identifies the predetermined patterns in the video information and identifies the coordinates of the predetermined patterns. Based upon one or more types output by the command recognizer, the character synthesizer retrieves animation information from the character store. Places the retrieved animation information at coordinates identified by the tracker. The character synthesizer outputs animation information to the overlay module. The overlay module generates a composite video signal from the animation information and possibly other video information and now puts it to the video rendering filter. The video rendering filter outputs the composite video information to a video display.

20 Claims, 3 Drawing Sheets

VIDEO TOKEN TRACKING SYSTEM FOR ANIMATION

BACKGROUND

The present invention relates to an automated animation synthesis tool based upon video input.

Input devices for computing systems have not been investigated to the same degree as output devices. In many ways, the traditional keyboard from decades ago remains the primary means of entering user input into a computer. The advent of the mouse, joystick and touch-screens has augmented keyboard input but still the vast majority of input data to the computer is done by keyboard. All of these devices are disadvantageous because they define only a limited set of input data that can be entered into the computer. The input is tied to a predetermined syntactic context. For example, a modern computer keyboard may include 101 keys. These keys may be used only in a finite number of combinations thus limiting the amount of data that can be entered into the computer. In the last few years, however, microphones and video cameras have begun to be shipped with new computers, enabling a fundamental change in how computers can perceive the world.

In modern computers, camera are becoming ubiquitous thanks in large part to the proliferation of video conferencing and imaging applications. Most video processing applications involve the capture and transmission of data. And, accordingly, most video technologies for the PC reside in codecs, conferencing, and television/media display. The amount of intelligent, semantic-based processing applied to the video stream typically is negligible. Further, there has been very little done to integrate semantic-based processing with computer operation.

There exists a need in the art for a human-machine interface that shifts away from the literal, "touch"-based input devices that have characterized computers for so long. Humans view the world associatively through visual and acoustical experience. The integration of video cameras and microphones now enable the computer to perceive their physical environments in a manner in which humans already do. Accordingly, computers that perceive their environment visually will start to bridge the perceptual gap between human beings and traditional computers.

The present invention is directed an animation application for visually perceptive computing devices.

SUMMARY

Embodiments of the present invention provide an animation system that may include a tracker and a token recognizer, each of which receives an input video signal. The animation system also may include a character synthesizer provided in communication with the tracker, the command recognizer and further with a character store.

DETAILED DESCRIPTION

The present invention provides an animation system that recognizes tokens from captured video information from a human user and generates an animated character in response thereto.

Figure 1:
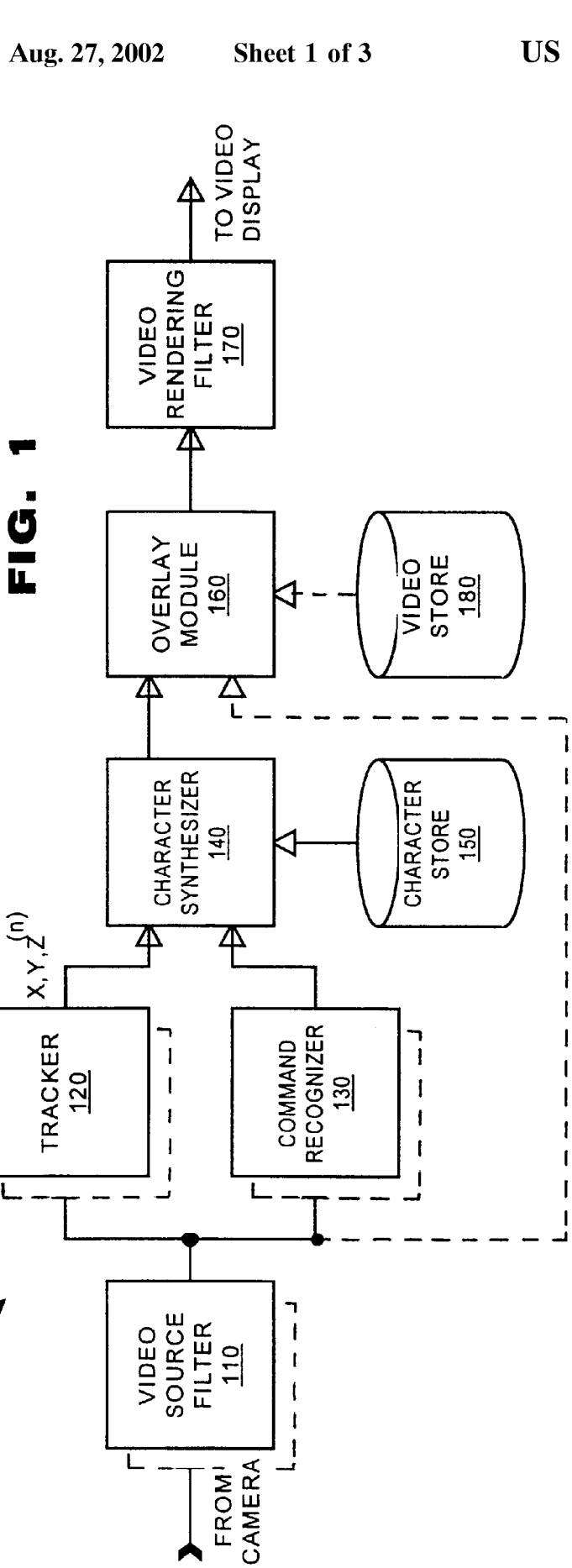
FIG. 1 is a block diagram of an animation system constructed in accordance with an embodiment of the present invention.

FIG. 1 illustrates a block diagram of an animation system 100 constructed in accordance with an embodiment the present invention. The animation system 100 may include a video source filter 110, a tracking filter 120, a command recognizer 130, a character synthesizer 140, a character store 150, an overlay module 160, and a video rendering filter 170. Optionally, the animation system 100 may include a video store 180.

The video source filter 110 receives an input video signal from a video device (not shown) such as a video camera. It filters and processes the input video signal into a form appropriate for use with in the animation system 100. The video source filter 110 outputs video data to the tracker 120 and the command recognizer 130.

The source filter 110 may be provided directly connected to the video input device. in such an embodiment, the source filter 110 may include software drivers for the video input device. Alternatively, the source filter 110 may receive video data over a communication channel provided by a telecommunication or computer network (also not shown). In this alternate embodiment, the source filter 110 may include communication interface hardware and/ or software as may be required to interface the animation system 100 to the network.

The tracker 120 may receive video data from the video source filter 110. The tracker 120 is adapted to recognize data from one or more tokens that may be present in the video data. The tracker 120 determines a coordinate of a token(s) when they are found. The tracker 120 outputs a data signal representing the coordinates of tokens that are recognized.

As is known, a processing system may be trained to recognize "tokens" of a variety of different types. Typically, a token possesses a unique shape, color, pattern or temporal signature to permit the processing system to distinguish it from other content in a captured video data stream. For example, a simple token may be a colored object having a predetermined shape (say, a circle) or color (say, a red object). Tokens have included predetermined symbols such as a user's hand, a glove, a sheet of paper, a flashlight, a pulsating infrared device and a two-dimensional bar code. Indeed, processing systems have recognized and tracked a user's fingertip as a token. The principles of the present invention find application with any type of token that may be recognized and tracked by a processing system.

According to an embodiment of the present invention the tracker 120 may resolve the coordinates of a token into (x, y) coordinates representing the token's position in the plane of the input video signal. Alternatively, the tracker 120 may resolve the token's position into (x, y, z) coordinates where the z dimension represents a depth of the token in the input video data and also may include three degrees of rotation. A token's depth often relates to the distance an object is displaced from the camera. Resolution of tokens in video data into a three-dimensional coordinate system is known in the art. See:

"Real-Time Hand Tracking and Gesture Recognition Using Smart Snakes," Tony Heap and Ferdinando Samaria of Olivetti Research Limited.

"A Generic System for Image interpretation using flexible templates," A. F. Hill, T. F. Coote and C. J. Taylor. Proc. of the British Machine Vision Conference "Local Correlation measures for motion analysis: a comparative study." P. J. Burt, C. Yen, and X. Xu, IEEE CPRIP.

The command recognizer 130 also identifies tokens from the input video signal. Once it identifies the predetermined tokens, the command recognizer 130 identifies a "type" of the token. For example, the token recognizer 130 might recognize that a square token is of a different type than a circular token. It outputs a signal identifying the token's type to the character synthesizer 140.

The character store 150 stores video data in association with the stored token types. In one implementation directed to children, the character store 150 may store video data of a plurality of cartoon characters. Video data of a character would be recalled from the character store 150 when an operator includes the character's associated token in the input video signal.

The character synthesizer 140 receives coordinate information from tracker 120 and type information from the command recognizer 130 for each token in the video data. In response to these inputs, the character synthesizer 140 retrieves video data from the character store 150 and generates an overlay signal. The type signal determines which information content is retrieved from the character store 150. The coordinate information determines where the retrieved video signal information content is placed in the overlay signal. The character synthesizer 140 may perform retrieve and position video data for as many tokens as were recognized by the animation system 100.

An overlay module 160 synthesizes a composite video signal from the overlay signal from the character synthesizer 140 and from any other video signals as may be input to it. For example, as shown in phantom, the overlay module 160 may receive an additional video signal from the video store 180. In a first embodiment of the present invention, the overlay module 160 may generate a composite image by superimposing the overlay signal from the character synthesizer 140 over other video information that may be retrieved from the video store 180. Alternatively, also shown in phantom, the overlay module 160 may receive the input video signal output from the video source filter 110. In a second embodiment of the present invention, the overlay module 160 may generate a composite video image by superimposing the overlay signal upon the input video information signal. In either case, the overlay module 160 outputs a composite video signal to the video rendering filter 170.

The video rendering filter 170 outputs a video signal from the animation system 100. It may be connected to a video display device (not shown) such as a monitor. In such an embodiment, the video rendering filter 170 may include as many hardware or software drivers as may be necessary to control operation of the video display. Alternatively, the rendering filter 170 may output the video data through a communication channel provided by a telecommunication or computer network (also not shown). In this alternate embodiment, the rendering filter 170 may include communication interface hardware and/or software as may be required to interface the animation system 100 to the network.

As discussed above, the character synthesizer 140 may retrieve video data from the character store 150 for multiple tokens that may be identified by the tracker 120 and command recognizer 130. Additionally, the character synthesizer 140 may receive token information from multiple trackers 120 and command recognizers 130. Alternatively, the character store 140 may receive token information from multiple trackers 120 and command recognizers 130 connected to multiple video sources (not shown). As shown in phantom, the trackers 120 and token recognizers 130 may be duplicated to interface with multiple input video signals from multiple users. In this regard, the operation of character synthesizer 140 need not change. It simply receives more input signals from multiple trackers 120 and command recognizers 130 and retrieves and positions video data in an overlay signal in response thereto.

The animation system 100 shown in FIG. 1 may be implemented in hardware or software. In a hardware embodiment, FIG. 1 represents hardware elements that may be provided in an integrated circuit such as an application specific integrated circuit. In a software embodiment, FIG. 1 represents functional processes that may be performed in a general purpose processor or a digital signal processor.

Figure 2:
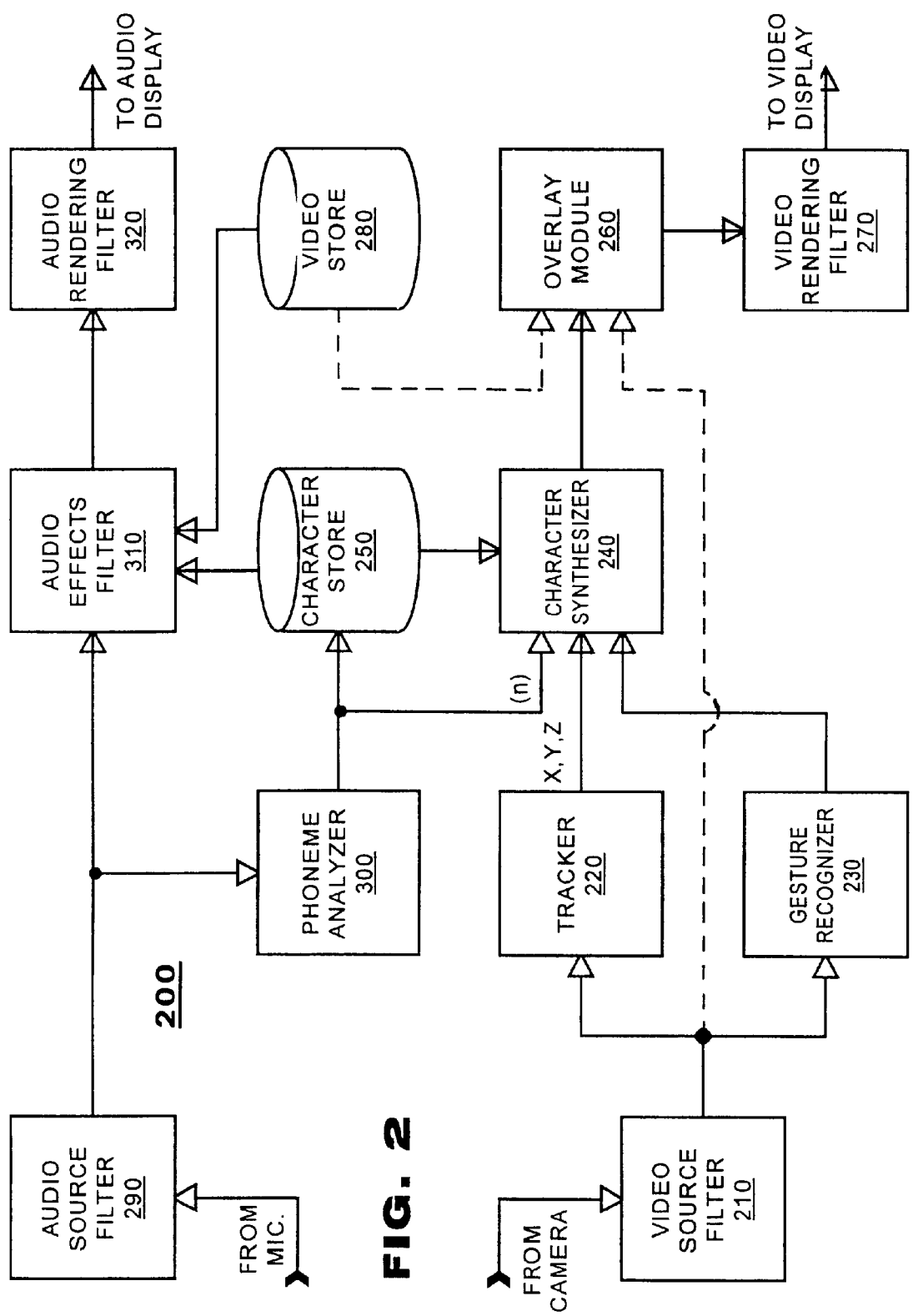
FIG. 2 is a block diagram of an animation system constructed in accordance with an embodiment of the present invention.

FIG. 2 illustrates an animation system 200 constructed in accordance with a second embodiment of the present invention. The animation system 200 includes a video source filter 210, a tracker 220, a command recognizer 230, a character synthesizer 240, a character store 250, an overlay module 260, a video rendering filter 270 and, optionally, a video store 280. These components may possess the functionality of their counterparts shown in FIG. 1. Additionally, the animation system 200 may include an audio source filter 290, a phoneme analyzer 300, an audio effect filter 310 and an audio rendering filter 320. The animation system 200 may provide animation synchronized to an audio input signal in addition to the video animation as described with respect to FIG. 1.

An input audio signal is input to the audio source filter 290. The input audio signal may originate at a microphone or other audio device (not shown) that may connect directly to the audio source filter 290. The audio source filters the input audio signal and outputs it to the phoneme analyzer 300 and audio effect filter 310.

The phoneme analyzer 300 receives the input audio signal and decodes it to identify phonemes that may be present therein. As is known, phonemes are short units of speech somewhat akin to syllables or other short utterances. Phoneme analysis and detection is known per se. The phoneme analyzer 300 outputs a signal identifying decoded phonemes to the character synthesizer 240 and, optionally, to the character store 250.

In addition to the functionality as described with reference to FIG. 1, the character synthesizer 240 may animate character data in response to the signal output from the phoneme analyzer 300. For example, it may be desirable in certain embodiments for animated characters to speak. Based upon the decoded phonemes, the character synthesizer 240 may animate portions of character video data retrieved from the character store 250 to coincide with the decoded phonemes. More realistic animation effects may be obtained when, coincident with associated spoken text, an animated character's face is animated to give the effect that the character is speaking the text.

The filtered input audio signal is input also to the audio effect filter 310. The audio effect filter 310 may modify the input audio signal with audio effects that may be more in keeping with the video retrieved from the character store 250 or, alternatively, from the video store 280. In this embodiment, when the character synthesizer 240 retrieves video information from the character store 250, the character synthesizer 240 also retrieves associated audio effect information based upon phonemes received from the phonemes analyzer 300. The character store 250 output the audio effect information to the audio effect filter 310. The audio effect filter 310 may use the audio effect information to modify the input audio data with the effect. For example, those familiar with the Disney animated character Donald Duck® will recall that the character spoke with a distorted voice. If the animation system 200 is used to animate this character, distortion may be applied to the input audio signal to provide this effect.

In another embodiment, audio effect information may be obtained from the video store 280. In this case, the audio effect information may be stored in association with video information at video store 280 to provide audio effects that are in keeping with the video information stored at video store 280. Again, using a cartoon as an example, an audio effect may be provided when the setting of the cartoon is under water. It would be possible to store audio effect information which would cause the audio effect filter 310 to apply "bubbling" sound effects to the input audio signal when the underwater scene is input from the video store 280 to the overlay module 260. Thus, responsive to audio effect information output by either character store 250 or video store 280, the audio effect filter 310 may modify the input audio signal. Modified audio data may be output to audio rendering filter 320.

According to yet another embodiment of the present invention, character store 250 may include phonemes associated with video data. Based upon decoded phonemes output from phoneme analyzer 300, the character synthesizer 240 may recall not only video information of a character but also phonemes associated with a character. The character store 250 outputs the retrieved phonemes to audio effect filter 310. In this embodiment, the audio effect filter 310 replaces the input audio signal with the phonemes received from the character store 250. This embodiment would permit an "actor" to speak for a character in the actor's normal voice but the character, when displayed through video and audio devices, would be presented using the character's voice. In this embodiment, the audio effect filter 310 need not be connected to the audio source filter 290 as shown in FIG. 2.

The audio rendering filter 320 formats the modified audio data for delivery to an audio display (not shown) system such as a speaker system. The audio rendering filter 320 may include hardware drivers as necessary to control operation of the audio display.

Figure 3:
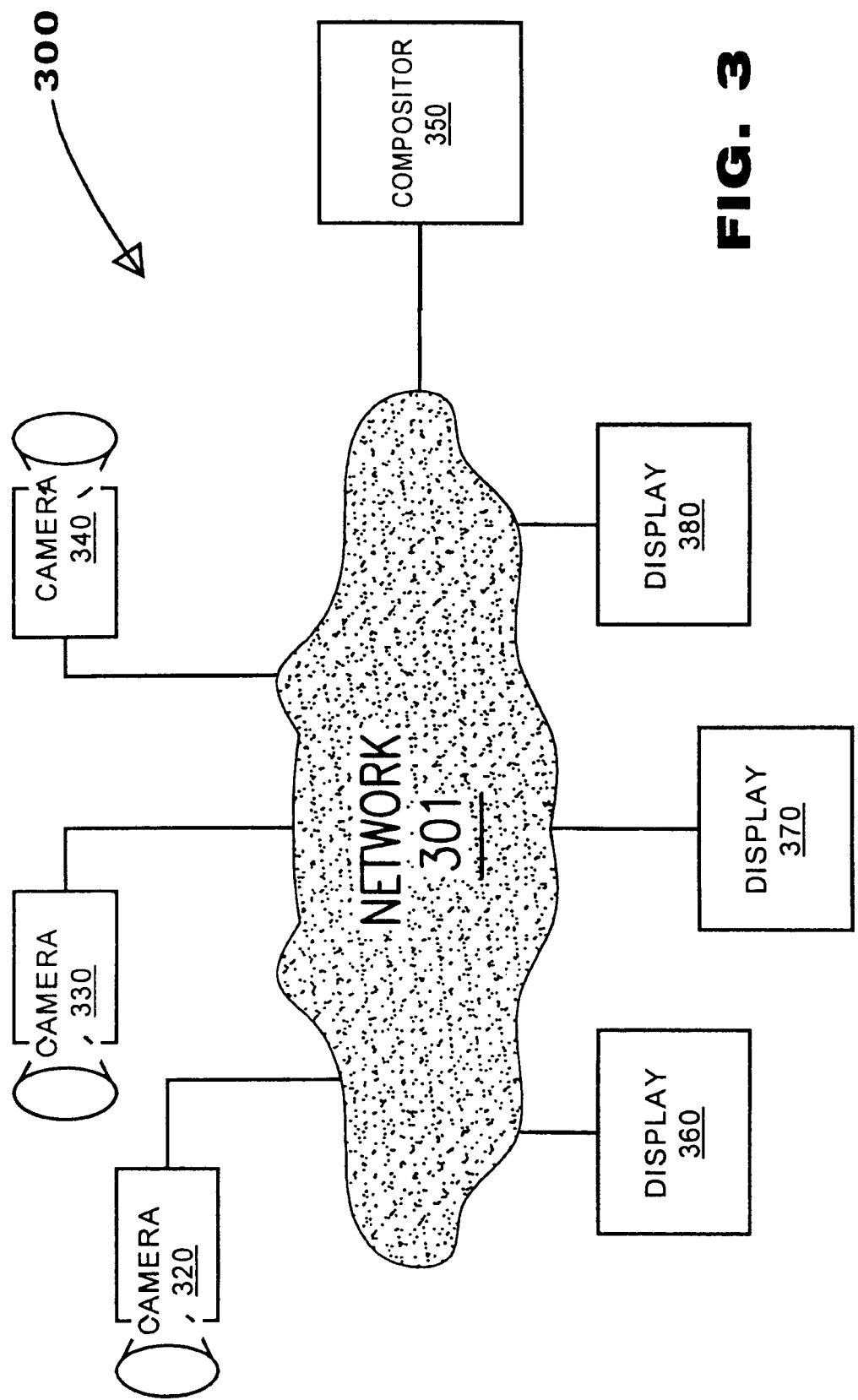
FIG. 3 is a block diagram of an animation system constructed in accordance with yet another embodiment of the present invention.

FIG. 3 illustrates an animation system 300 constructed in accordance with yet another embodiment of the present invention. The animation 300 operates over a computer network 310. In particular, cameras 320, 330, 340 capture video information that includes a plurality of users manipulating tokens. Each camera 320–340 may receive commands from a different user. Video input data from each camera 320–340 is routed to compositor 350. The compositor 350 operates as an animation system such as the animation system 100 of FIG. 1. The compositor 350 generates a composite video image based upon the commands detected from the video input streams of cameras 320–340. The compositor 350 may route the composite video image to a plurality of displays 350–380 via network 310. Thus, the operation of the present invention may integrate the operation of tokens from one or more spatially distributed users, decode the operation, generate animation information therefrom, and resolve the animation information into a single composite video signal. It then may route the composite video signal to one or more displays.

Several embodiments of the present invention are specifically illustrated and described herein. However, it will be appreciated that modifications and variations of the present invention are covered by the above teachings and within the purview of the appended claims without departing from the spirit and intended scope of the invention.

Several embodiments of the present invention have been described with reference to particular types of video data such as cartoons. The present invention is not limited to any specific type of video information or video information content.

We claim:

1. An animation system comprising:
   a tracker having an input for video input data, the tracker to identify a location and type of a token contained in the video input data,
   a command recognizer having an input adapted to receive video input data, to identify a type of the token,
   a character store having a plurality of characters indexed by token types, and
   a character synthesizer in communication with the tracker, the command recognizer and the character store, to retrieve one of the characters from the character store based upon token type and to place the character in an output video data at the location of the token.

2. The animation system of claim 1, further comprising an overlay module in communication with the character synthesizer and having an input for a second video data.

3. The animation system of claim 2, wherein the overlay module input is in communication with the video input data.

4. The animation system claim 2, further comprising a video store provided in communication with the overlay module input.

5. The animation system of claim 2, wherein the overlay module input for the second video data via a computer network.

6. The animation system of claim 1, further comprising a second tracker to identify a location of a second token contained in a second video input data and a second command recognizer to identify a type of the second token contained in the second video input data each adapted to receive the second input video data and in communication with the character synthesizer.

7. The animation system of claim 1, further comprising a phoneme analyzer adapted to receive audio input data and in communication with the character synthesizer.

8. The animation system of claim 7, further comprising an audio effect filter adapted to receive the audio input data and provided in communication with the character store.

9. An animation method, comprising:
   receiving an input video data signal,
   recognizing a predetermined pattern within the input video data signal,
   determining which one of a plurality of positions and types of predetermined patterns is contained within the input video data signal,
   based upon the type of predetermined pattern, retrieving character data from a memory,
   placing the character data in a video output signal based upon the position of the predetermined pattern,
   determining a movement of the predetermined pattern within the input video data signal, and
   moving the character data within the video output signal according to the movement of the predetermined pattern within the input video data signal.

10. The method of claim 9, wherein the placing step includes superimposing the character data over a second video data.

11. The method of claim 10, wherein the second video data is the input video data.

12. The method of claim 11, wherein the second video data is retrieved from a second memory.

13. The method of claim 11, wherein the second video data is received from a computer network.

14. The method of claim 9, further comprising:
   receiving an input audio signal, decoding the audio signal, and animating the retrieved character data based on the decoded audio signal.

15. The method of claim 14, wherein the decoding step includes detecting phonemes from the input audio signal.

16. The method of claim 9, further comprising receiving an input audio signal, and based on the type of input audio signal, altering the input audio signal, and outputting the altered audio signal.

17. A computer readable medium having stored thereon program instructions that, when executed by a processor, cause the processor to:

receive an input video signal, recognize a predetermined pattern within the input video signal, determine which one of a plurality of positions and types of the predetermined pattern is contained within the input video signal, based on the type of the predetermined pattern, associate character data with the predetermined pattern, wherein the character data includes audio data associated with video data, based on the position of the predetermined pattern, place the character data in a video output signal, and output the video output signal.

18. A video data signal, created according to the process of:

receiving an input video signal, recognizing a predetermined pattern within the input video signal, determining which one of a plurality of positions and types of the predetermined pattern is contained within the input video signal, based on the type of the predetermined pattern, associating character data with the predetermined pattern, wherein the character data comprises audio data and video data, based on the position of the predetermined pattern, placing the character data in a video output signal, outputting the video output signal.

19. An animation system, comprising:

a source of input audio-visual data, including at least one token, a tracker to identify a location of the token in the audio-visual data, a command recognizer to identify a type of the token, a character synthesizer to receive the type and location of the token and to retrieve data from a character store according to the type of the token, the character store including phonemes and character video data, and a rendering filter to output the character data at the location of the token in a display of output audio-visual data.

20. The animation system of claim 19 wherein the tracker identifies the location of the token in the input audio-visual data according to a set of coordinates and the rendering filter outputs the character data in the location determined by the coordinates.

* * * * *